United States Patent [19]
McPhee et al.

[11] 3,828,122
[45] Aug. 6, 1974

[54] TV AREA CORRELATION TRACKER

[75] Inventors: Walter J. McPhee; Richard D. Sondergard, both of Mishawaka, Ind.

[73] Assignee: The Bendix Corporation, South Bend, Ind.

[22] Filed: Sept. 11, 1972

[21] Appl. No.: 287,940

Related U.S. Application Data

[63] Continuation-in-part of Ser. No. 76,520, Sept. 29, 1970.

[52] U.S. Cl. ...... 178/6.8, 178/DIG. 21, 250/203 CT
[51] Int. Cl. ........................... G01s 5/16, H04n 7/18
[58] Field of Search ..................... 178/DIG. 21, 6.8; 250/203 CT

[56] References Cited
UNITED STATES PATENTS
3,039,002  6/1962  Guerth .................... 178/DIG. 21
3,412,397  11/1968  Evans ..................... 178/DIG. 21
3,707,598  12/1972  Scarbrough ............... 178/DIG. 21

Primary Examiner—Howard W. Britton
Attorney, Agent, or Firm—Leo H. McCormick, Jr.; Willam N. Antonis

[57] ABSTRACT

A means for tracking a target using a television monitoring system. A joy stick type control is used to position a rectangle of sampled video on a television monitor over a desired target. After pushing a target acquisition switch, the target is maintained within the rectangle by comparing a digital representation of the video signal for the rectangle with a smaller reference rectangle of the initially sampled video. The part of the larger rectangle that has the highest correlation with the reference rectangle is assumed to be the location of the target. Therefore, a feedback loop is used to reposition the larger rectangle until the point of maximum correlation is located at the center thereof. This comparison is made for each frame of video information of the television system. Simultaneously with the repositioning of the larger rectangle to centrally enclose the desired target, a camera of the television system is tending to reposition itself to locate the rectangle of sampled video within the center of the field of view. The physical repositioning of the camera is much slower than the electronic repositioning of the larger rectangle over the reference rectangle. The control loop that is used to maintain the target within the center of the field of view may be used to direct a missile or other conventional weapon toward the target.

2 Claims, 5 Drawing Figures

TV AREA CORRELATION TRACKER

This application is a continuation-in-part of our parent application Ser. No. 76,520, filed Sept. 29, 1970.

BACKGROUND OF THE INVENTION

Within recent years many different methods have been proposed to provide an on-board tracking system for airborne missiles. One method of tracking a desired target has been by airborne radar equipment that is very bulky, complicated and expensive. The signal received from the radar unit is normally processed in analog form utilizing resolver and servo control techniques. Such a control system is very slow and, many times, very inaccurate.

Another proposed method has been the utilization of light sensitive diodes to form a matrix of the target area. The pattern formed by the light sensitive diodes that represents a specific target is then continuously followed in the control logic. The pattern formed by the light sensitive diodes may not give as fine a resolution as desired in the particular tracking system.

Several proposals have been made to utilize a television camera in a target acquisition and tracking system. However, these devices have a limited application because they are normally associated with dual rotating discs wherein, if the information received through a slot of one disc is identical with the information received through a slot of the other disc, the system is tracking the correct target. However, the application of this type of system is extremely limited because of the physical requirement of rotating discs. Another system involves the use of a camera whereby a picture is taken of a target area and, periodically thereafter, updated. Pictures are scanned on a line-by-line basis to locate the desired target. A feedback loop then directs the missiles toward the desired target. Such a system is slow and not suitable for the present day missiles.

It is an object of the present invention to utilize a conventional television camera and monitoring system with appropriate control logic to follow a desired target in a field of view being monitored by the television camera.

It is another object of this invention to provide the control logic with a means initially memorizing a digital video representation of a desired target and, thereafter comparing the digital video representation with subsequent frames from the TV camera and, simultaneously, providing a feedback loop to the TV camera for continuously repositioning the camera to follow the desired target.

It is still another object of the invention to utilize a joy stick type of control to select a small portion of a total area monitored by a television camera wherein a desired target is located and, thereafter, following the target by comparing a video representation of the small portion against subsequent frames of the television camera. The television camera is continuously repositioned so that the point of maximum correlation is maintained at the proximate center of a monitoring screen.

An even further object of this invention is to provide digital means for a television tracking system wherein an initial memory register contains the desired target and a current memory register which encircles the initial memory register is compared against the initial memory register to locate the maximum point of correlation between the two registers. The location of the maximum point of correlation is fed back to the camera control system for repositioning the point of maximum correlation at the approximate center of the field of view.

It is a still further object of the invention to utilize a joy stick type of control to position a rectangle over the desired target shown on a monitoring screen of the television camera. Upon pressing a target acquisition switch, the joy stick control is removed and a control circuit continuously repositions the rectangle of sampled video so that it continuously encloses the target as in the initial video frame. A smaller rectangle of video information containing the target is memorized as a reference. Simultaneously, but at a slower rate, the television system automatically tries to position the larger rectangle within the center of the field of view by means of a servo control of the camera platform. The control circuit compares an initial memory of the video signal contained within the small rectangle with the current video signal from the larger rectangle. A video signal for both rectangles is converted into a digital form. The video signal for the smaller rectangle is then compared with every position in the larger rectangle. The point of maximum correlation between the digital representations is memorized and its location noted in a memory register. The memory register is then converted from a digital to analog form for the repositioning of the larger rectangle to maintain the target and the small rectangle within the approximate center of the larger rectangle. A feedback loop slowly repositions the camera to maintain the larger rectangle within the center of the field of view.

DESCRIPTION OF THE PREFERRED EMBODIMENT

Figure 1:
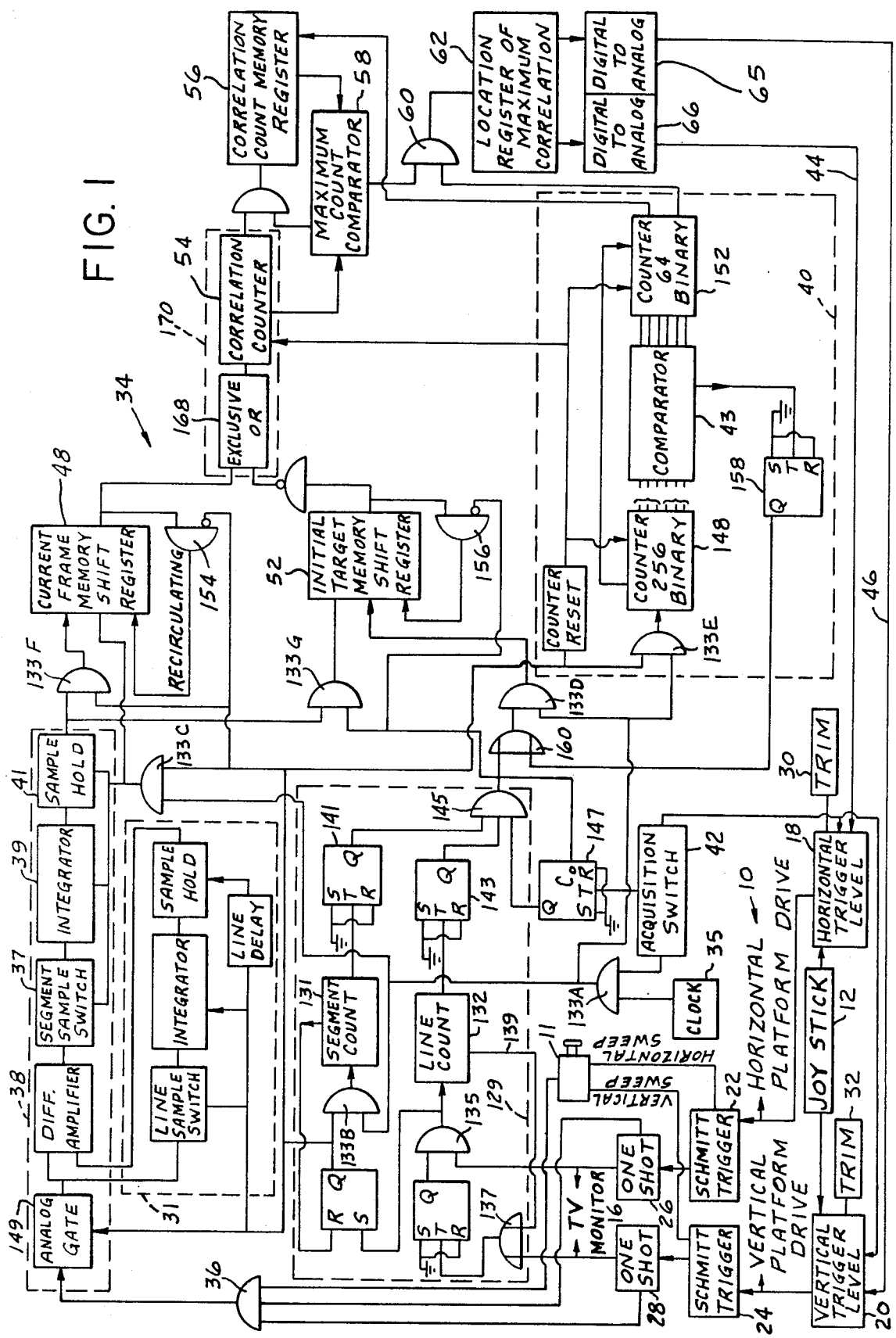
FIG. 1 is a functional block diagram of the control circuit of a television correlation tracker.

Referring now to FIG. 1, there is shown generally a control portion 10 of a television area correlation tracker and monitoring system. Though the television camera 11 and system is not shown in detail, it is of a conventional type. Referring jointly between FIGS. 1 and 2, a joy stick 12 is used to vary the position of rectangle 14 about the field of view shown on television monitor 16. As the joy stick 12 is varied, the horizontal trigger level 18 and/or the vertical level 20 will also be varied. The outputs of horizontal trigger level 18 and vertical level 20 feed through Schmitt triggers 22 and 24, respectively. Schmitt trigger 22 will give an output when the input to horizontal trigger level 18 is equal to the horizontal sweep of the camera. Likewise, Schmitt trigger 24 will give an output when the input to vertical trigger level 20 and vertical sweep of the camera are of the same voltage. The output of Schmitt triggers 22 and 24 fire one shots 26 and 28, respectively. The outputs of one shots 26 and 28 are used to locate the rectangle 14 on the monitoring screen 16.

Figure 2A:
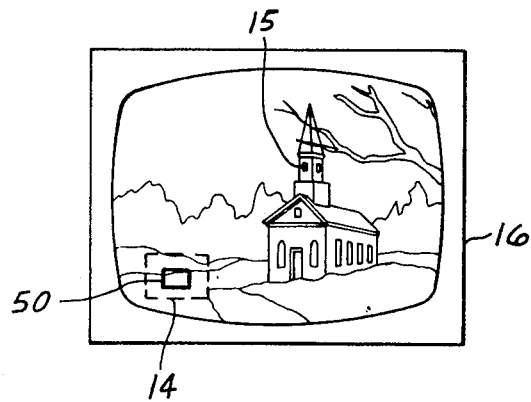
FIG. 2A–2D show an illustrated picture on the television monitor and the positioning of the desired target within the center of the field of view and maintained within the center of the view by the small enclosing rectangle.
Figure 2B:
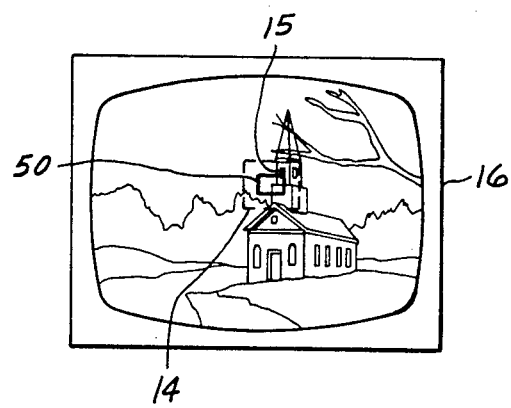
Figure 2C:
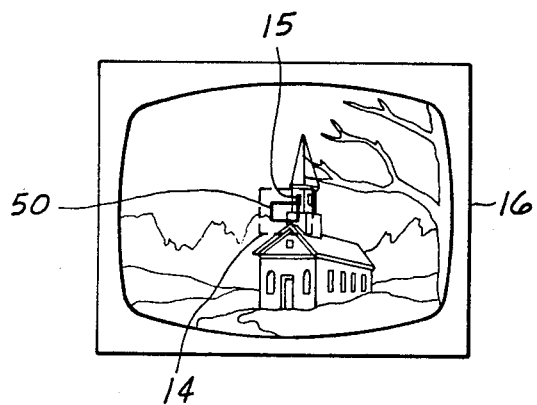
Figure 2D:
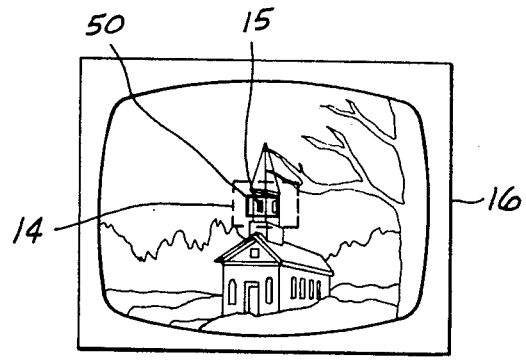

Referring to FIG. 2A, the position of the rectangle 14 is in the lower left hand portion of the field of view. By the movement of the joy stick 12 which feeds a voltage representation from horizontal trigger level 18 and vertical trigger level 20 through Schmitt triggers 22 and 24, and one shots 26 and 28, respectively, to the television monitor 16, the rectangle 14 can be repositioned to contain the desired target. For the purposes of this illustration, assume that the light in the church house steeple 15 is the desired target. Referring to FIG. 2B, the rectangle 14 has been located to contain the light in the church house steeple 15. In FIG. 2C the field of view of the television camera has changed due to repositioning of the television camera. The repositioning of the television camera, which is much slower than the movement of the rectangle 14, is continuously repositioned to try to maintain the rectangle 14 within the center of the field of view. In FIG. 2C the rectangle has been repositioned to the center of the field of view by the repositioning of the television camera. If the desired target is not centrally located within the rectangle, a fine tuning trim 30 for horizontal trigger level 18 and fine tuning trim 32 for vertical trigger level 20 may be used to centrally locate the target, i.e., the light in the church house steeple 15, within the center of rectangle 14.

The same one shots 26 and 28, that are used to control the position of rectangle 14 on television monitor 16 are also used to control the video input to the signal processing portion 34 of the correlation tracker. Since one shot 28 triggers for the remainder of picture frame, and one shot 26 triggers for the remainder of the line of scan, this locates the upper left corner of rectangle 14. A video input from the television monitor 16 can be gated through analog "and" gate 36 when outputs from both one shots are present and, thereafter, into an analog-to-pulse converter 38.

The entire processing portion 34 is sequentially controlled by a centralized clock 35 of any known type such as an R. C. coupled multivibrator made up of integral circuit "nor" gates 133A, 133B, 133C, 133D, 133E, 133F, and 133G. A typical example would be one that operates in the approximate range of 3 to 3.3 megacycles. The segment switch 37 of the analog-to-pulse converter 38 divides the incoming video signals up into small segments. A typical length of one of the segments would be 0.3 microseconds. Each segment is fed into an integrator 39. If the output of the integrator, at the end of a segment, is plus, it is applied to sample and hold 41 as a binary one and if negative it is applied as zero. The analog-to-pulse converter 38 only accepts a predetermined number of continuous segments for each line of scan of the video input signal as determined by a memory input and sampling control 129. The control 129 is regulated by a segment counter 131 and a line counter 132 each of which is capable of sequentially supplying an operational signal count up to 16. The segment counter 131 is activated by a first toggle signal from gate 133A to gate 133B. The first toggle signal from the clock 35, typically a one megahertz oscillator, sets the line length termination of the video gate at 16 microseconds. Simultaneously with first toggle signal transmission, the line counter 132 is activated by a second toggle signal which is developed from the horizontal gate pulse through the one shot 26 on gate 135. The line counter 132 terminates the vertical limit video gate 137 at 16 lines through a feedback signal carried on lead 139. Both the segment counter 131 and the line counter 132 generated an output signal at the fourth and twelfth counts through toggle switches 141 and 143, respectively, to "and" gate 145 for establishing the start and finish of the read-in to the initial target memory or initial target memory shift register 52. Similarly, the control 129 also times the read-in, toggling and circulating of the current frame memory 48 during the memory or current frame memory shift register read-in period upon activation of the actuation or target acquisition switch 42 through the interconnection of gate 133B with gate 133C and toggle 147 on gate 133F. Additionally, the central clock 35 through control 129 sets the number of lines and the number of segments per line in the analog-to-pulse converter 38 and prevents the receiving of additional video inputs through analog gate 149 for that line of scan. This is repeated for a given number of lines of scan to form rectangle 14. The binary outputs from the analog-to-pulse converter 38 are clocked into a current frame memory 48 and an initial target memory 52. The initial target memory 52 includes an 8×8 array means in a 64 bit register. There are eight partial T.V. lines broken up into eight 1-microsecond segments represented in binary bit form. This makes the gated target memory 8 microseconds long per line, as compared to the 63 microsecond time duration of one full T.V. line, and eight lines as compared to the full 512 of the T.V. roster.

The current frame memory 48 includes a 16×16 array in a 256 bit register. Thus the current frame memory 48 is double that of the initial target memory having 16 lines with 16 1-microsecond segments. The large size of the current frame memory 48 permits full target memory comparison correlations of 64 bits each with 64 separate areas within the 256 bit register. This can be visualized in two dimensions by considering the 8×8 initial target memory 52 initially superpositioned in the upper left of the 16×16 current frame memory 48 for the first 64 bit correlation. For the next comparison the initial target memory 52 is shifted one segment to the right. This is continued stepwise through eight positions to the right and then back to the left starting point, but down one line. This sequencing is continued through eight successive lines for the 64 position correlations of 64 bits each.

Referring back to the locating of the desired target within the rectangle 14, it has been previously described that joy stick 12 will locate the target within the rectangle 14. Upon locating the target within the rectangle 14, a target acquistion switch 42 is pushed that relieves the control of the horizontal trigger level 18 and the vertical trigger level 20 from the joy stick 12. Thereafter, horizontal trigger level 18 and vertical trigger level 20 will be controlled by inputs 44 and 46, respectively, as will be subsequently described. Likewise, the target acquisition switch 42 triggers the toggle switch 147 which activates the gate 145 of the memory input and sampling control 129 to start a gated count for the first frame of video information received from the television camera. The clock signal through gate 133A, control 129 and gate 133F applies analog-to-pulse converter 38 output to current frame memory 48. The toggle 147 will transmit a signal to gate 133G thru gate 145 for selecting the transmission of a portion of the output from the analog-to-pulse converter 38 into the initial target memory 52 to provide a reference. Referring back to FIGS. 2A–2C, there is shown a smaller rectangle 50 located within rectangle 14. The gated count line counter 132 counts down a predetermined number of lines of scan and in a predetermined number of segments of the video signal to centrally locate rectangle 50 within rectangle 14. The digital representation of the video signal for the small rectangle 50 is stored in initial target memory 52 for comparison as will now be described.

On subsequent frames of video information received from the television camera 11, the produced output of the analog-to-pulse converter 38 will be fed through gate 133F into current frame memory 48. Notice that for every frame the outputs from analog-to-pulse converter 38 will update the current frame memory 48 which represents the video signal for rectangle 14. On subsequent frames after the first frame and when all of the video information has been received by the current frame memory 48, a clock command from gate 133A and sampling control 129 will be received by gate 133E to start the comparison of the initial frame memory 52 with the current frame memory 48 as timed by memory comparison sequence counters 40.

In the comparison processing the data in the current frame memory 48 is continuously recirculated but the data in the initial target memory 52 recirculation is controlled by the memory comparison sequence counters or binary counters 148 and 152 to give the required coincidence of the memory outputs from comparator 43. The initial target memory 52 and the current frame memory 48 are actually series shift registers rather than matrix arrays. At the end of read-in period the sampling control 129 removes the activating signal from the memory input "and" gates and also removes the inhibit signal from the memory recirculation lines 154 and 156 to thereby change from read-in to memory recirculation and comparison processing. The binary counter or sequence counter 148 is a 256 count device while binary counter or sequence counter 152 is a 64 count device. The clocking pulse to the 256 count unit 148 is controlled by the same signal as the recirculation of the current frame memory 48 to keep the two in unison. The 64 count unit 152 is toggled once for every full sequence of the 256 counter. In the 256 unit 148 the first four bits correspond to 16 segment count and the last four correspond to line count. The first three bits of each are compared with corresponding three bits of six bit 64 count unit.

For every eight count in the segments and every eight count in the lines there is a repeat in the binary code which therefore provides a start stop code combination that will correspond to the required start stop of the 8 × 8 matrix in the initial target memory 52 within the 16 × 16 matrix in the current frame memory 48. These points are picked out by a corresponding pair of three bit signals from the 64 counter unit 152. The resulting output signals from the comparator 43 then trips a toggle flip-flop 158 which in turn, thru gates 160 and 133D, gate the clock to the initial target memory 52.

The toggle pulse from the 256 counter 148 steps the 64 counter 152 one place for each 256 full cycle. This then steps the coincidence signals in the comparator 43 one place to provide the step shift in target to frame memory correlations.

Since the gated count controller 40 has centrally located rectangle 50 within rectangle 14, the 8 × 8 array will start on the fifth segment in the fifth line down from the upper left corner of rectangle 14.

To compare the current frame memory 48 with the initial target frame memory 52, the outputs of the two memories 48 and 52 are fed into a Digital Correlator 170 composed of the exclusive OR 168 and the correlation counter 54. For like inputs and with one signal inverted the exclusive OR 168 produces a "1" count which is registered on the correlation counter 54. Maximum correlation of a 64 segment scene would give a count of 64. Complete non-correlation would be 32 and full negative correlation zero count. At the finish of the 64 point correlation of one location, the count on the correlation counter 54 is compared in the maximum count comparator 58 to the count of the previous location, as registered on the correlation count memory register 56. If the new count is greater, it is gated in to replace the old count on the correlation count memory register 56. The comparator 58 also gates the code on the comparison sequence counters 148 and 152 and on to the location register 62. The count on the sequence counter 152 represents the binary location of the initial target memory 52 with respect to the current frame memory 48. Hence, the code on the location register of maximum correlation 62 after the last of the 64 correlations of 64 points each is that of the location of maximum correlation or, in other words, the initial target memory 52 position within the current frame memory 48. In more particular detail, as illustrated in FIG. 2 after each bit in rectangle 50 has been compared with each bit in rectangle 14 upon which it has been superimposed, a total count will be recorded in the correlation memory register 56. The correlation memory register 56 may be a series type counter. This count is also recorded in the maximum count comparator 58, and the location of rectangle 14 is noted by recording the output of the sequence counter 152 on location register 62. After the comparison of rectangle 50 with the upper left hand portion of rectangle 14, on a digital bit-by-bit basis, the rectangle 14 will be repositioned one segment or bit to the right of its previous position. Again, the digital representation of rectangle 50 will be compared with the digital representation of a portion of rectangle 14 upon which it has been superimposed.

The correlation count on counter 54 is compared with the previous count contained on count memory register 56 by the maximum count comparator 58 and if greater, the comparator correlation count memory register 56 is updated and the location as indicated on sequence counter 152 is gated into location register of maximum correlation 62.

This previously described method of correlation comparison is repeated for each position of rectangle 50 over each portion of rectangle 14 until the 64 superimposed comparison have been completed. The comparison starts in the upper left hand corner and moves horizontally across rectangle 14. Thereafter, rectangle 50 is repositioned one line down and is again compared for each location across rectangle 14. This is continued until each conceivable superimposed position (64 in all) of rectangle 50 upon rectangle 14 has been compared to obtain a correlation count for each position. The position with the maximum correlation count will have its location noted in comparison sequence counter 152. Thereafter, the comparison sequence counter 152 is clocked into location register of maximum correlation 62 for the repositioning of rectangle 14 whereby the point of maximum correlation will be centrally located within its boundaries. This binary code location in location register 62 is then changed in the digital to analog converters 65 and 66 into an analog value with zero vertical and horizontal outputs corresponding to code number 32 with eight steps in both directions on each axis for full plus and minus outputs to horizontal and vertical. These signals are fed into a corresponding horizontal trigger level 18 and vertical trigger level 20 to immediately reposition rectangle 14 so that smaller rectangle 50 will be centrally located therewithin. Since rectangle 50 contains the desired target, i.e., the light in the church house steeple 15, the target will be centrally located within rectangle 14. The outputs of the horizontal trigger level 18 and a vertical trigger level 20 also drive the horizontal platform drive and the vertical platform drive, respectively, to reposition the television camera so that rectangle 14 is in the center of the field of view. However, the mechanical repositioning of the television camera is much slower than the electronic controls for repositioning the rectangle 14 by changing the output voltage of the horizontal trigger level 18 and vertical trigger level 20.

At this point it should be noted that the correlation comparison is taking place for each frame of video information received from the television camera 11. Therefore, the size of the triangles 50 and 14 must be reasonably small so that the correlation comparison can take place before the next video input is received from analog "And" gate 36. Hence, the present invention has been operated with rectangle 14 being formed by the previously mentioned 16 × 16 bit array and rectangle 50 formed by the previously mentioned 8 × 8 bit array with a 3.3 megacycle clock being used to time the operation of the processing portion 34 of the television area correlation tracker. Obviously, other rectangular dimensions, different clock times, and different segments of video information can be used. If memory size were sufficient, rectangle 14 could correspond to the size of the TV monitor 16. However, current digital systems are not fast enough to compare rectangle 50 with each possible location on the total television screen and obtain a maximum correlation count within one frame of the conventional television system.

This device provides for automatic tracking of any given area or feature in the viewing field through a conventionally scanned television camera 11 (visible or other). The selected area is indicated as an electronically superimposed rectangle 14 on T.V. monitor 16 which is initially positionable by joy stick 12 and then switched to automatic at any desired location. The rectangle tracks the area and gives output coordinate x and y location signals for use in driving the horizontal and vertical platform of a weapon means (not shown).

The tracking of the rectangular area 14 is accomplished through the integrated circuits of the initial or target 52 and current 48 frame shift register memories. Use of two memories gives representations of the scene to permit processing between successive scans on the T.V. camera 11. The scene information is in two level binary form on integrated circuit shift registers, and, therefore, can be compared and processed in any desired sequence. One is on the initial reference frame memory 52 of the selected limited area and the other is current frame memory 48 of a larger surrounding area. The current frame memory is updated each frame of the T.V. camera 11 scan. The reference memory or initial target memory shift register 52 is sequentially compared throughout the subsequent frame for the location of its replica. With the locating of the replica position, coordinate error signals of the offset from the center of the current frame memory 48 are used to reposition the selection of the subsequent current frame memory such that the replica position is re-centered. In such manner, the current frame memory 48 and the superimposed rectangle 14 on the monitor 16 follow the live video image that matches the reference memory.

It should be noted that if an aircraft is tracking a target for a prolonged period of time, it may be necessary to update the initial frame memory 52. Since operation of the processor for automatic tracking is initiated with the manual control target acquisition switch 42 which gates on the clock 35 to initiate an operational signal which activates the various circuits with the exception of the Schmitt triggers 22 and 24 which are always on to permit manual positioning by the joy stick 12 of the video gate prior to acquisition. The acquisition switch 42 activates the flip-flop in toggle 147 to energize the third input of an "and" gate 145 which permits later read-in to the initial target memory 52 with timed signals from the sampling control 129 to activate the two other inputs of the "and" gate 145. At the end of this initial target memory 52 read-in period a clear signal is fed back to the flip-flop in toggle 147 which prevents any subsequent read-in to the current frame memory 52 until such time the acquisition switch 42 is reactivated by the operator for current memory updating. This may be done by repositioning the rectangle 14 over the target and repressing the target acquisition switch 42. Also, the initial target memory could be updated periodically from the information within the center of rectangle 14 by an automatic clock signal. However, this could cause the target to slowly drift due to changing video representations. It should be understood that this system is designed primarily for short range tracking wherein the slow drift would not be a significant factor.

We claim:
1. A tracking system comprising:
a television system for monitoring a variable area, said television system including a camera and monitor means;
control means for selecting a first area containing a specific part of said variable area;
means for repositioning said camera so that said first area and specific part are centrally located on said monitor;
means for converting a video signal from said first area into a digital representation for each segment of said video signal;
gate controller for selecting a second area surrounded by said first area, said specific part being further centrally located within said second area;
clock means for sequentially shifting the transfer of selective processed digital representations of the video signal of the first area along the converting means to the gate controller;
initial memory for retaining the first said digital representation for said second area when said control means has selected said specific part;

current memory for retaining said digital representation until the next digital representation from another frame of said television system has been received;

means for correlating said initial memory against said current memory to obtain the location of maximum correlation between said digital representation of said initial and current memories;

correlation counter means for determining the number of bits of said digital representation of said second area that correspond with each location within said first area;

correlation memory means for retaining the maximum number of bits that correspond;

location means for noting the location where said maximum number was obtained; and feedback means for altering said control means to maintain said second area which contains said specific part within the same center location of said first area, said repositioning means subsequently following said altered control means.

2. A tracking system comprising:

scanning means for monitoring a variable area, said scanning means including a camera and monitor means;

control means for selecting a first area containing a specific part of said variable area;

means for repositioning said camera so that said first area and specific part are centrally located on said monitor;

means for converting a video signal from said first area into a digital representation for each segment of said video signal;

gate controller for selecting a second area surrounded by said first area, said specific part being further centrally located within said second area;

clock means for sequentially shifting the transfer of selective processed digital representations of the video signal of the first area along the converting means to the gate controller;

initial memory for retaining the first said digital representation for said second area when said control means has selected said specific part;

current memory for retaining said digital representation until the next digital representation from another frame of said television system has been received;

means for correlating said initial memory against said current memory to obtain the location of maximum correlation between said digital representation of said initial and current memories;

correlation counter means for determining the number of bits of said digital representation of said second area that correspond with each location within said first area;

correlation memory means for retaining the maximum number of bits that correspond;

location means for noting the location where said maximum number was obtained; and feedback means for altering said control means to maintain said second area which contains said specific part within the same center location of said first area, said repositioning means subsequently following said altered control means.

* * * * *